Nov. 7, 1944.   G. ROSELAND   2,362,224
AIRCRAFT
Filed Nov. 2, 1942   3 Sheets-Sheet 1

INVENTOR
GUSTAV ROSELAND
BY
ATTORNEY

Patented Nov. 7, 1944

2,362,224

UNITED STATES PATENT OFFICE 2,362,224

AIRCRAFT

Gustav Roseland, Portland, Oreg.

Application November 2, 1942, Serial No. 464,168

1 Claim. (Cl. 244—48)

This invention relates to improvements in aircraft and more particularly to the wing construction and flight controls therefor.

One of the principal objects of the invention is the provision of a new and novel wing mounting, by means of which the wing may be moved about its longitudinal axis into various angles of attack to control flight. Each half of the wing may be controlled independently of the other for maneuverability, and both halves of the wing may be operated together as a unit or selectively independent of each other.

A further object of the invention is the provision of manual means for operating the wing as aforesaid. This operating means also serves as a shock-absorber to the wing to absorb shock applied thereto by up-drafts and down-drafts of air-currents. Said means allows the wing to yield to the shocks about its longitudinal axis and restores it to a proper position for normal flight.

These and other objects will appear as my invention is more fully hereinafter described, in the following specification, illustrated in accompanying drawings, and finally pointed out in the appended claim.

Figure 1:
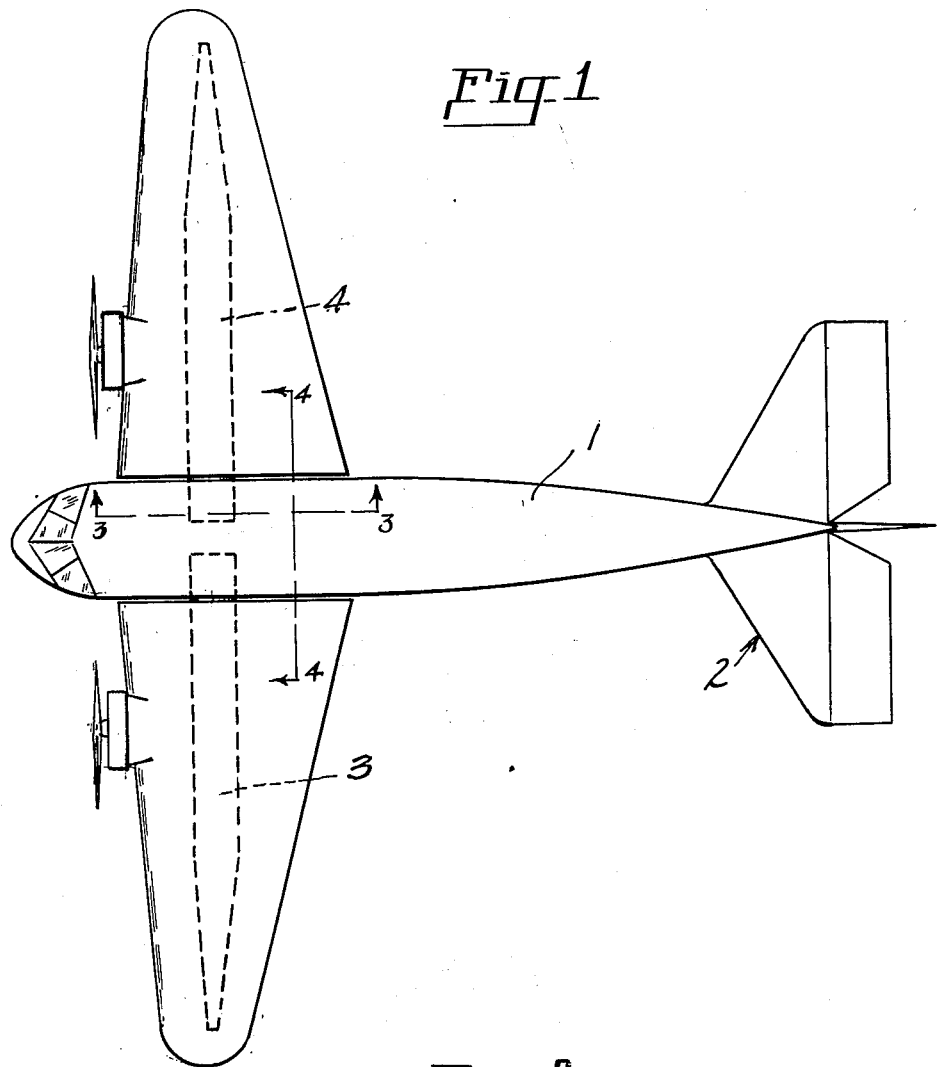
Figure 1 is a plan view of an airplane, built in accordance with my invention.
Figure 2:
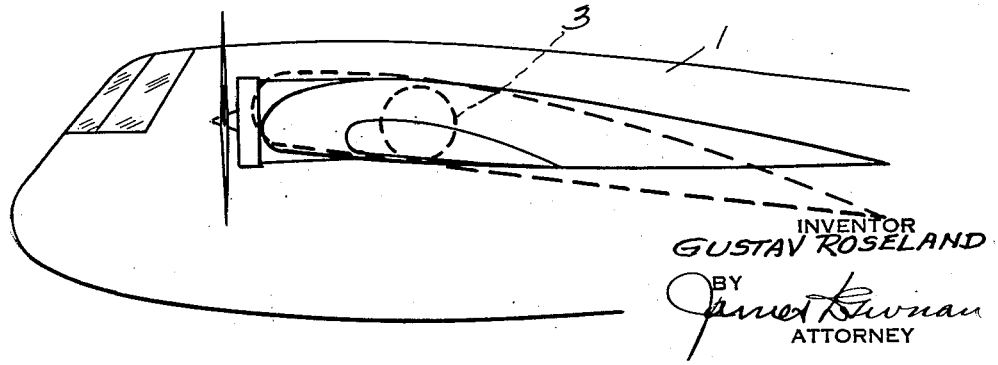
Figure 2 is fragmentary side elevation of Figure 1.

Referring now more particularly to the drawings:

In Figure 1, reference numeral 1 indicates the fuselage of an airplane having the usual empennage generally indicated at 2 and comprising the usual tail group of flight control surfaces. Near the forward end of the fuselage I rotatably mount a wing-beam, formed in two halves 3 and 4, by means of bearings 5 and 6 secured to the side walls 7 and 8 of the fuselage and also by bearings 9 and 10 secured to the underside of the top wall 11 of the fuselage.

To each section of the wing-beam I secure actuating arms 12 and 13. Each arm is connected as at 14 and 15 to actuating mechanisms which are identical with each other, and therefore a description of one will suffice for both.

The actuating mechanism comprises an air cylinder 16, pivotally mounted as at 17 to a bracket 18, which is adjustably mounted to the side wall of the fuselage by means of bolts 19, passing through slots 20. A piston 21 is slidably mounted in the cylinder and is connected to the actuating arm 13 by means of a connecting rod 22 so that movement of the piston to the left or right will impart corresponding movement to the actuating arm 13, which will rotate the wing beam and the wing secured to it to vary the angle of attack of the wing.

The cylinder 21 is formed with two intake ports 23, and 24, connected by flexible hoses or tubing 25 and 26, respectively, with valves 27 and 28, respectively. Both valves are in open communication with check valves 29, 30 which are connected as shown with a supply line 31, extending from an air pressure tank 32. The cylinder 16 is also formed with an exhaust duct 33 which is connected by a flexible hose or tube 34, with exhaust valve 35; the core of which is bored as at 36 and is attached to an actuating handle 37.

In the position shown, the valve 35 is open and air is free to exhaust out through the outlet port 38. The cores 39 and 40 of each valve 28 and 29 are provided with actuating arms 41 and 42, respectively, whose ends are connected to tension springs 43, secured, as shown, to any suitable anchorage. These actuating arms are connected by links 44 and 45 to the actuating lever 37, as shown. The link 44 is slotted as at 46 and the link 45 is slotted as at 47 to slidably embrace pins 48 and 49, mounted on the arms 41 and 42.

Figure 3:
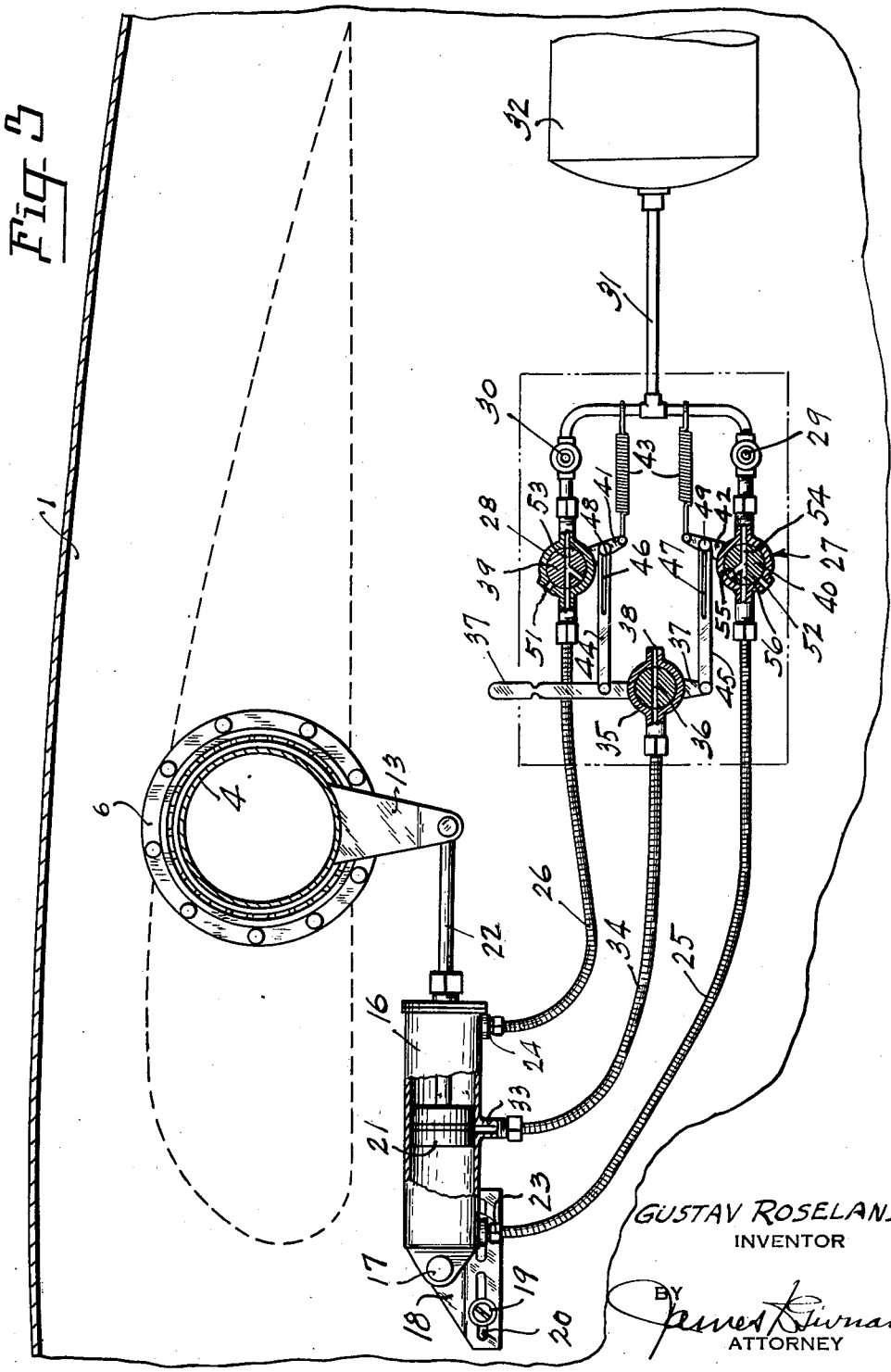
Figure 3 is an enlarged sectional side elevation taken on the line 3—3 of Figure 1.
Figure 4:
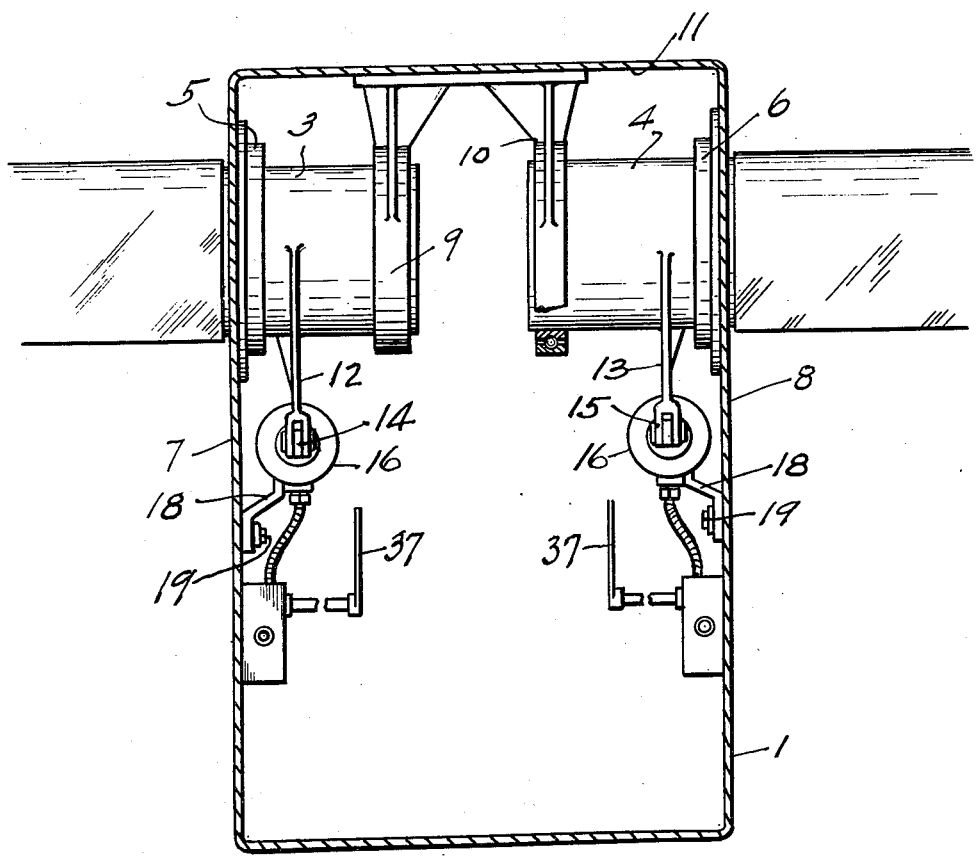
Figure 4 is an enlarged sectional end elevation taken on the line 4—4 of Figure 1.

The slots in the links allow, for example, the actuating arm 42 of the valve 27 to be pulled to the left, as viewed in Figure 3, without disturbing the setting of the arm 41 of the valve 28 for the reason that when the actuating arm 37 is pulled to the right with a resultant movement to the left of its lower end, the end of the slot 47 engages the pin and pulls the arm 42 to the left while the link 44 merely slides to the right about the pin 48.

The housings of the valves 27 and 28 are formed with exhaust ports 51 and 52, respectively. The core 39 of valve 28 is formed with a Y shaped bore 53, as is also the core 40 of valve 27 provided with a similar bore 54. With the bores of both valves 27 and 28 in the positions shown, it will be apparent that air, under pressure, may pass from the tank through both valves and into the cylinder 16 to provide what might be termed an air cushion on opposite sides of the piston 21. With the piston in the position shown, it seals the exhaust port 33 in the cylinder and maintains the wing in a position for normal flight. It will also be apparent that when the ship or wings encounter air bumps, caused by up-drafts and down-currents, the wing will be allowed to yield to the bumps by its pivotal movement with the wing beam and be quickly restored to a position for normal flight. Such restoration is accomplished by compression of air in advance of the movement of the piston and an expansion of the air behind the piston. This is especially true if the bump is violent enough to move the piston 21 to a position where it uncovers the exhaust port 33 and allows the air behind the piston to escape through the exhaust valve 35. Compression of the air within the cylinder in advance of the piston 21 is obtained by reason of the fact that escapement is prevented by the check valve 29.

For maneuvering the ship, or controlling its flight, the actuating levers 37 are moved forwardly or rearwardly, either together, for imparting uniform movement to both wings, or separately, to meet the demands of the flight condition. For example, if it is desired to bank the ship to the left, the actuating lever 37 on the right-hand side of the ship is pulled rearwardly, while the actuating lever on the left-hand side is moved forwardly. Rearward movement of the actuating lever on the right-hand side rotates the core 40 of the valve 27 into a position whereat the air pressure from the tank 32 is cut off, while the air pressure on the left-hand side of the piston 21, as viewed in Figure 3, is released through the air line 25 and out through the bore 54 of the valve 27 which, by rearward movement of the lever 37, as aforesaid, assumes the position whereat the air enters the branch 55, which has been positioned into communication with the airline 25 while that part of the bore 56 is positioned in open communication with the exhaust duct 52.

As previously stated, movement of the arm 42 of the valve 27, does not disturb the setting of the arm 41 of the valve 28; consequently, the core 39 thereof remains, in the position shown, to supply air to the interior of the cylinder 16 on the right-hand side of the piston 21, as viewed in Figure 3, which causes the piston to move to the left with a corresponding movement of the arm 13, secured to the wing section, and such movement of the arm 13 will, of course, cause the leading edge of the wing to lift and the trailing edge to lower. This increased angle of attack, of course, will cause the right-hand wing, or the right-hand section thereof, to lift.

An opposite movement of the actuating lever 37 on the left-hand side of the ship into a forward position will reverse the setting of the valves, as previously described, into positions where air is being applied into the cylinder on the left-hand side of piston 21, which obviously will move the leading edge of the left-hand wing downwardly and the trailing edge upwardly. Movement of the actuating lever 37 in either direction off the vertical will, of course, close the exhaust port 38 so that if the piston moves to either side, sufficiently to uncover the exhaust port 33 and the cylinder 16, air will not be exhausted. When the piston 21 is moved in either direction, for controlling flight, the air in advance of the piston is allowed to exhaust through whichever of the valves 27 and 28 is open, and thence through either check valve 29 or 30.

Although I have shown the invention applied to the wings of an aircraft, it is to be understood that the invention may be applied to any airfoil section thereof, such as the movable tail surfaces and the like. It is also understood that the invention is readily adaptable to any type of aircraft, whether power driven or of the glider type.

The wing beams 3 and 4 are, preferably, of hollow, tubular construction and, if desired, may be of sufficient diameter to permit the operator or mechanic to crawl or walk through the wing beam, if necessary, to gain access to engines or other parts needing attention.

While I have shown a particular form of embodiment of my invention, I am aware that any minor changes therein will readily suggest themselves to others, skilled in the art, without departing from the spirit and scope of the invention.

Having thus described my invention, what I claim as new and desire to protect by Letters Patent is:

An aircraft wing and flight controls therefor, comprising hollow cylindrical wing beams, extending outwardly from each side of the fuselage of the aircraft and independently rotatable with respect thereto, a wing secured to each wing beam for rotation therewith, and means for selectively or simultaneously rotating the wing beams to vary the angle of attack of the wings, said means comprising an air cylinder pivotally attached to a bracket adjustably mounted to the fuselage and a piston in the cylinder connected with the wing beam, an air-pressure tank connected with the cylinder at both ends thereof through valves for selectively directing air pressure to either or both ends of the piston, valves operable by movement of the piston to certain limits for exhausting air from the cylinder, whereby the piston is cushioned between its limits of movement to yield to shocks transmitted from the wing and to restore the wing to a position for normal flight.

GUSTAV ROSELAND.